(12) United States Patent
Gaal (10) Patent No.: US 7,957,263 B2
(45) Date of Patent: Jun. 7, 2011

(54) METHOD AND APPARATUS FOR ACKNOWLEDGING REVERSE LINK TRANSMISSIONS IN A COMMUNICATIONS SYSTEM

(75) Inventor: Peter Gaal, San Diego, CA (US)

(73) Assignee: Qualcomm Corporation, San Diego, CA (US)

( * ) Notice: Subject to any disclaimer, the term of this patent is extended or adjusted under 35 U.S.C. 154(b) by 1059 days.

(21) Appl. No.: 10/935,973

(22) Filed: Sep. 7, 2004

(65) Prior Publication Data

US 2005/0117508 A1 Jun. 2, 2005

Related U.S. Application Data

(60) Provisional application No. 60/501,555, filed on Sep. 8, 2003.

(51) Int. Cl.
*H04J 11/00* (2006.01)
(52) U.S. Cl. ......... 370/209; 370/235; 375/146; 375/147
(58) Field of Classification Search .................. 370/209, 370/203, 208, 335; 375/146, 147
See application file for complete search history.

(56) References Cited

U.S. PATENT DOCUMENTS

| | | | |
|---|---|---|---|
| 5,577,024 A | 11/1996 | Malkamaki et al. ............. 370/18 |
| 6,091,761 A | 7/2000 | Popovic ......................... 375/150 |
| 6,341,125 B1 * | 1/2002 | Hong et al. .................... 370/335 |
| 6,990,138 B2 * | 1/2006 | Bejjani et al. ................. 375/146 |
| 7,013,143 B2 * | 3/2006 | Love et al. .................... 455/450 |
| 7,110,349 B2 * | 9/2006 | Branlund et al. ............. 370/203 |
| 7,194,324 B2 | 3/2007 | Sollner |
| 7,299,402 B2 | 11/2007 | Soong et al. |
| 2001/0051529 A1 * | 12/2001 | Davies .......................... 455/519 |
| 2003/0193971 A1 * | 10/2003 | Baggen et al. ................ 370/528 |
| 2004/0193971 A1 * | 9/2004 | Soong et al. .................. 714/704 |

FOREIGN PATENT DOCUMENTS

| | | |
|---|---|---|
| WO | WO506364 A1 | 3/1995 |
| WO | WO0133884 A1 | 5/2001 |
| WO | WO05027397 | 3/2005 |
| WO | WO 2005027397 A1 * | 3/2005 |

OTHER PUBLICATIONS

Popovic; Branislav M., Efficient Despreaders for Multi-Code CDMA Systems, IEEE 1997, pp. 516-520.*
Kumar, P. Vijay, and Robert A. Scholtz, Bounds on the Linear Span of Bent Sequences, IEEE 1983, pp. 854-862.*
Nishinaga et al: "Orthogonal M-ary Spread Spectrum System under Carrier Frequency Offset", 1996 IEEE, pp. 214-218, Aug. 1996.

(Continued)

*Primary Examiner* — Ricky Ngo
*Assistant Examiner* — Luat Phung
(74) *Attorney, Agent, or Firm* — Larry J. Moskowitz (57) ABSTRACT

A method and apparatus for acknowledging reverse link transmissions in a communications system. An information bit is set and then repeated. The repeated information bit is covered with a code having a frame length defined by S=M*N*R, where S is the frame length, M is the number of code symbols per slot, N is the number of slots per frame, and R is the code repetition factor. The gain is then set relative to a power control transmission and the frames resulting from the coding operation are then modulated. After modulation, the result is spread on a designated channel using quadrature spreading and after spreading the acknowledgement is transmitted over the reverse link.

28 Claims, 7 Drawing Sheets

OTHER PUBLICATIONS

Donelan et al: "Method for generating sets of orthogonal sequences", Electronic Letters, vol. 35, No. 18, Sep. 2, 1999.
International Search Report-PCT/US04/029305, International Search Authority-European Patent Office, Jan. 25, 2005.
TIA/EIA/IS-856 CDMA2000 High Rate Packet Data Air Interface Specification (the IS-856 Standard).
Written Opinion—PCT/US04/029305, International Search Authority, European Patent Office, Jan. 25, 2005.

* cited by examiner

METHOD AND APPARATUS FOR ACKNOWLEDGING REVERSE LINK TRANSMISSIONS IN A COMMUNICATIONS SYSTEM

CLAIM OF PRIORITY UNDER 35 U.S.C. §119

The present Application for Patent claims priority to Provisional Application No. 60/501,555 entitled "Method and Apparatus for Acknowledging Reverse Link Transmissions in a Communication System" filed Sep. 8, 2003, and assigned to the assignee hereof and hereby expressly incorporated by reference herein.

FIELD OF THE INVENTION

The present invention relates generally to communication systems, and more specifically, to a method and apparatus for acknowledging reverse link transmissions in a communication system.

BACKGROUND

Wireless communication technologies have seen tremendous growth in the last few years. This growth has been fueled in part by the freedom of movement offered by wireless technologies and the greatly improved quality of voice and data communications over the wireless medium. Improved quality of voice services along with the addition of data services have had and will continue to have a significant effect on the communicating public.

One type of service enjoying growth has been data service over portable communication devices, especially the delivery of high speed wireless data to mobile and fixed terminals. TIA/EIA/IS-856 "cdma 2000 High Rate Packet Data Air Interface Specification", 1xEV-DO is an air interface optimized for the delivery of high-speed wireless data to mobile and fixed terminals.

Data transmission differs from voice transmission in several key aspects. Voice transmissions are characterized by low, fixed and constant delays. However, voice transmission is more sensitive to delay with long latencies above 100 msec being intolerable. Voice transmissions also tend to be more tolerant of bit errors and symmetric in the forward and reverse directions.

Data transmission is more tolerant of delays and delay variation than voice transmission. However, data transmission is less tolerant of bit errors and is asymmetric in the forward and reverse directions. In addition, data transmission is "bursty", especially when data is downloaded to a user.

Typically, a user requests information, such as a web page download when using a data system, such as 1xEV-DO. The data is sent to the user in "bursts" containing packets of the desired data. Data is arranged in a sequence of packets for transmission. Correct reception of the packets is crucial for using and manipulating the requested data. To insure that the user receives the data correctly a series of acknowledgements is sent to the source of the transmissions. These acknowledgments indicate which packets have been received and correctly decoded by the user's unit. In general, an acknowledgement channel or ACK channel is used for these transmissions with packets being acknowledged three slots after receipt. If a packet is not received correctly, a retransmission request is made and the packet retransmitted. Delay in retransmission can result in resending of packets that have been correctly received. Retransmission of packets increases delay and can negatively affect the user experience. Therefore, there is a need for an efficient method for acknowledging packet transmissions in a communication system.

SUMMARY

In one aspect of the invention, a method of acknowledging a transmission in a communication system is provided. The method comprises taking an information bit; repeating the information bit; covering the repeated information bit with a code, wherein the code has a frame length defined by $S=M*N*R$ where:
  S is the frame length
  M is a number of code symbols per slot
  N is a number of slots per frame
  R is a code repetition factor
  and then setting the gain relative to a power control transmission; modulating the resulting frames; spreading the frames on a designated channel using quadrature spreading; and then transmitting the result as an acknowledgment.

The method may also be performed using different matrix construction techniques. One embodiment uses a matrix having permuted H12 construction with basis vectors of the fast Fourier transform of length 4. A further embodiment uses a matrix resulting from m-sequence construction, interleaved with basis vectors of the fast Fourier transform of length 3.

In another aspect of the invention a device is provided. The device comprises a processor for taking an information bit; repeating the information bit; covering the repeated information bit with a code, wherein the code has a frame length defined by $S=M*N*R$ where:
  S is the frame length
  M is a number of code symbols per slot
  N is a number of slots per frame
  R is a code repetition factor
  and then setting the gain relative to a power control transmission; modulating the resulting frames; spreading the resulting frames on a designated channel using quadrature spreading; and then transmitting the result as an acknowledgment.

In another aspect of the invention a mobile terminal is provided. The mobile terminal comprises a processor for taking an information bit; repeating the information bit; covering the repeated information bit with a code, wherein the code has a frame length defined by $S=M*N*R$ where:
  S is the frame length
  M is a number of code symbols per slot
  N is a number of slots per frame
  R is a code repetition factor
  and then setting the gain relative to a power control transmission; modulating the resulting frames; spreading the resulting frames on a designated channel using quadrature spreading; and then transmitting the result as an acknowledgment.

DETAILED DESCRIPTION

Figure 1:
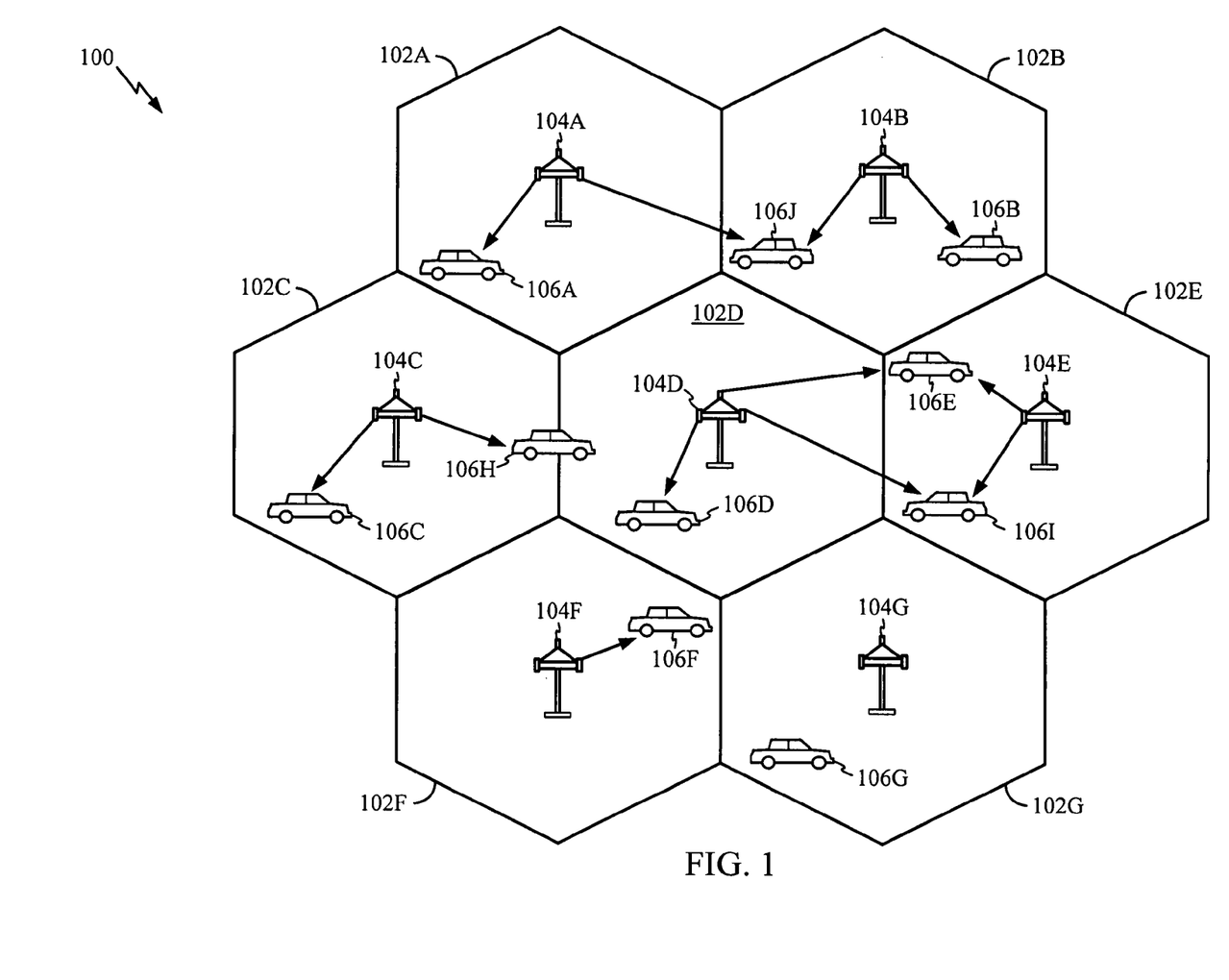
FIG. 1 is a diagram of an exemplary communication system in accordance with an embodiment of the invention.

FIG. 1 represents an exemplary communication system, 100. One such system is the CDMA communication system which conforms to the IS-95 standard. The communication system comprises multiple cells 102a-102g. Each cell 102 is serviced by a corresponding base station 104. Various remote stations 106 are dispersed throughout the communication system. In an advantageous embodiment, each of remote stations 106 communicates with zero or more base stations 104 on the forward link at each traffic channel frame or frame. For example, base station 104a transmits to remote stations 106a and 106j, base station 104b transmits to remote stations 106b and 106j and base station 104c transmits to remote stations 106c and 106h on the forward link at frame i. As shown by FIG. 1, each base station 104 transmits data to zero or more remote stations 106 at any given moment. In addition, the data rate can be variable and can be dependent on the carrier-to-interference ratio (C/I) as measured by the receiving remote station 106 and the required energy-per-bit-to-noise ratio (Eb/N0). The reverse link transmissions from remote stations 106 to base stations 104 are not shown in FIG. 1 for simplicity.

Figure 2:
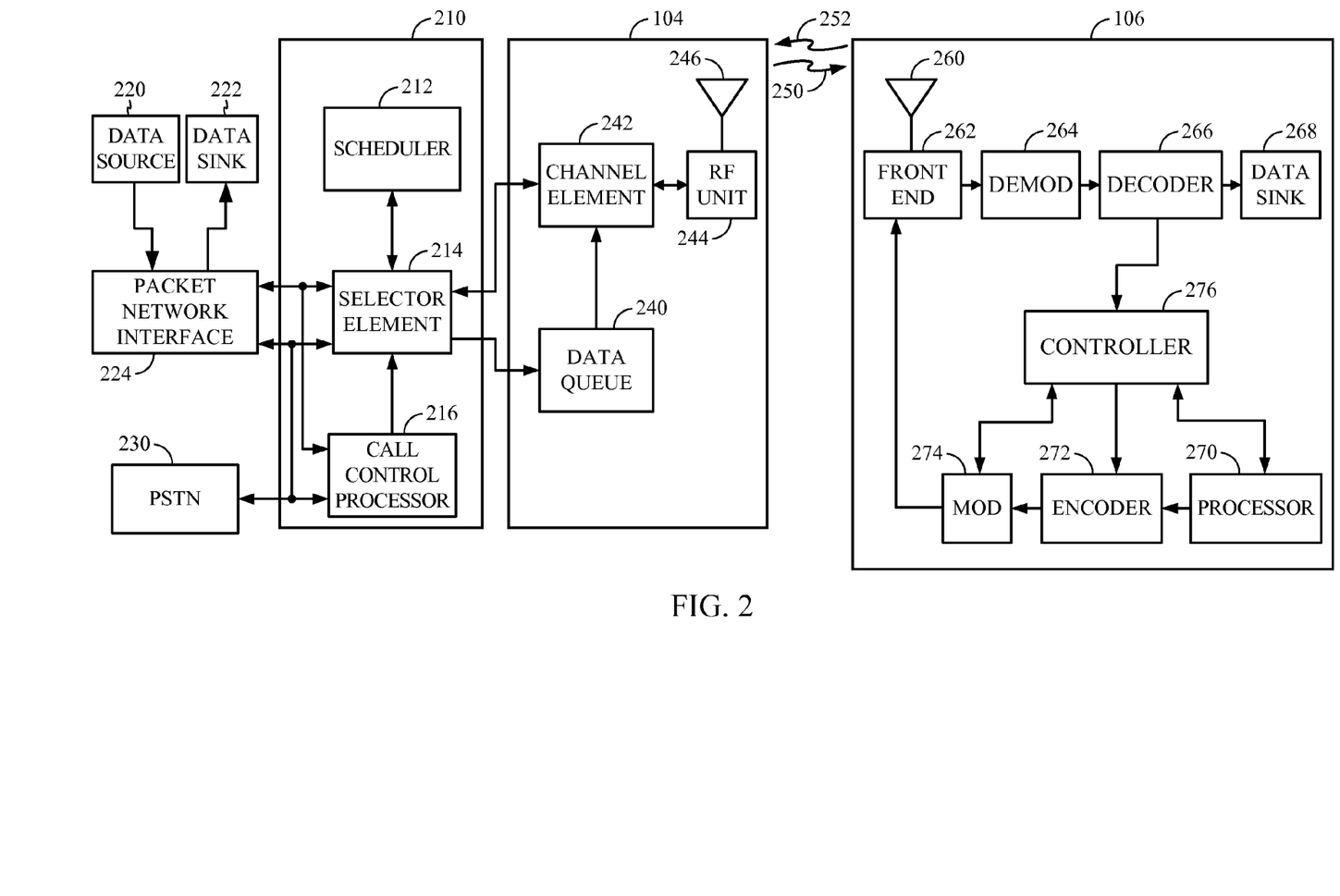
FIG. 2 is a block diagram illustrating the basic subsystems of an exemplary communication system in accordance with an embodiment of the invention.

FIG. 2 shows a block diagram illustrating the basic subsystems of an exemplary communication system. Base station controller 210 interfaces with packet network interface 224, Public Switched Telephone Network (PSTN) 230, and all base stations 104 in the communication system (only one base station 104 is shown in FIG. 2 for simplicity). Base station controller 210 coordinates the communication between remote station 106 in the communication system and other users connected to packet network interface 224 and PSTN 230. PSTN 230 interfaces with users through the standard telephone network (not shown in FIG. 2).

Base station controller 210 contains many selector elements 214, although only one is shown in FIG. 2. One selector element 214 is assigned to control the communication between one or more base stations 104 and one remote station 106. If selector element 214 has not been assigned to remote station 106, call control processor 216 is informed of the need to page remote station 106. Call control processor 216 then directs base station 104 to page remote station 106.

Data source 220 contains the data which is to be transmitted to remote station 106. Data source 220 provides the data to packet network interface 224. Packet network interface 224 receives the data and routes the data to selector element 214. Selector element 214 sends the data to each base station 104 in communication with remote station 106. Each base station maintains a data queue 240 which controls the data to be transmitted to remote station 106.

The data is sent, in data packets, from data queue 240 to channel element 242. One the forward link, a data packet refers to a fixed amount of data to be transmitted to the destination remote station 106 within one frame. For each data packet channel element 242 inserts the necessary control fields. Channel element 242 then encodes the formatted packet and interleaves the symbols within the encoded packet. The interleaved packet is then scrambled with a long PN code, covered with a Walsh cover, and spread. The result is provided to RF unit 244 which quadrature modulates, filters, and amplifies the signal. The forward link signal is transmitted over the air through antenna 246 on forward link 250.

At remote station 106, the forward link signal is received by antenna 260 and routed to a receiver within front end 262. The receiver filters, amplifies, quadrature demodulates, and quantizes the signal. The digitized signal is provided to demodulator (DEMOD) 264 where it is despread, decovered, and descrambled. The demodulated data is provided to decoder 266 which performs the inverse of the signal processing functions done at base station 104. In an embodiment of the present invention, processor 270 is used to create an acknowledgment channel according to the method of the present invention. The decoded data is provided to data sink 268.

The communication system supports data and message transmissions on the reverse link 252. Within remote station 106, controller 276 processes the data or message transmission by routing the data or message to encoder 272. Encoder 272 formats the message and then generates and appends a set of CRC bits, appends a set of code tail bits, encodes the data and appended bits, and reorders the symbols within the encoded data. The interleaved data is provided to modulator (MOD) 274. The data is then modulated, filtered, amplified, and then the reverse link signal is transmitted over the air, through antenna 260, on reverse link 252.

At base station 104, the reverse link signal is received by antenna 246 and provided to RF unit 244. RF unit 244 filters, amplifies, demodulates, and quantizes the signal and provides the digitized signal to channel element 242. Channel element 242 despreads the digitized signal. Channel element 242 also performs the Walsh code mapping or decovering, depending in the signal processing performed at remote station 106. Channel element 242 then reorders the demodulated data and decodes the de-interleaved data and The decoded data is then provided to selector element 214. Selector element 214 then routes the data and message to the appropriate destination.

The hardware as described above supports transmission of data, messaging, voice, video, and other communications over the forward link. Data specific architecture overlays this structure to support variable data rates and data optimization.

Scheduler 212 connects to all selector elements 214 within the base station controller 210. Scheduler 212 schedules high speed data transmissions on the forward and reverse links. Scheduler 212 receives the queue size, which indicates the amount of data to be transmitted. Using the queue size, scheduler 212 schedules data transmissions for maximum data throughput. Scheduler 212 coordinates the forward and reverse link high speed data transmissions over the entire communication system.

Increased desire and need for high speed data transfers over the forward link have led to the development of data optimizing architectures. A representative architecture is 1×EV-DO. A data optimized system is a wide area wireless system with an architecture including several system components: the wireless device or remote station, which may be a stand alone device or may be integrated within a phone, personal digital assistant (PDA), or computer; the Access Network, Base Station Transceiver Subsystem, (BTS), Packet Control Function (PCF), and Base Station Controller (BSC); Service Network, Mobile Switching Center (MSC) and Packet Data Serving Node (PDSN). A high speed or data optimized system is implemented within the same architecture as the IS-95 system described above. One difference is that the data optimized system does not use any Mobile Switching Center (MSC) resources. Another difference with a data optimized network is a high forward link data rate, typically from 38.4 kbps to 2.4 Mbps with a lower reverse link data rate range of 9.6 kbps to 153.7 kbps. The different rates arise because a user receives data content at a high rate and reviews it, but often have little or no need to respond to the content, which results in a lower reverse link data rate. One typical example is watching a received broadcast. The remote station responds automatically sending data acknowledgement messages to keep the broadcast content flowing.

Figure 3:
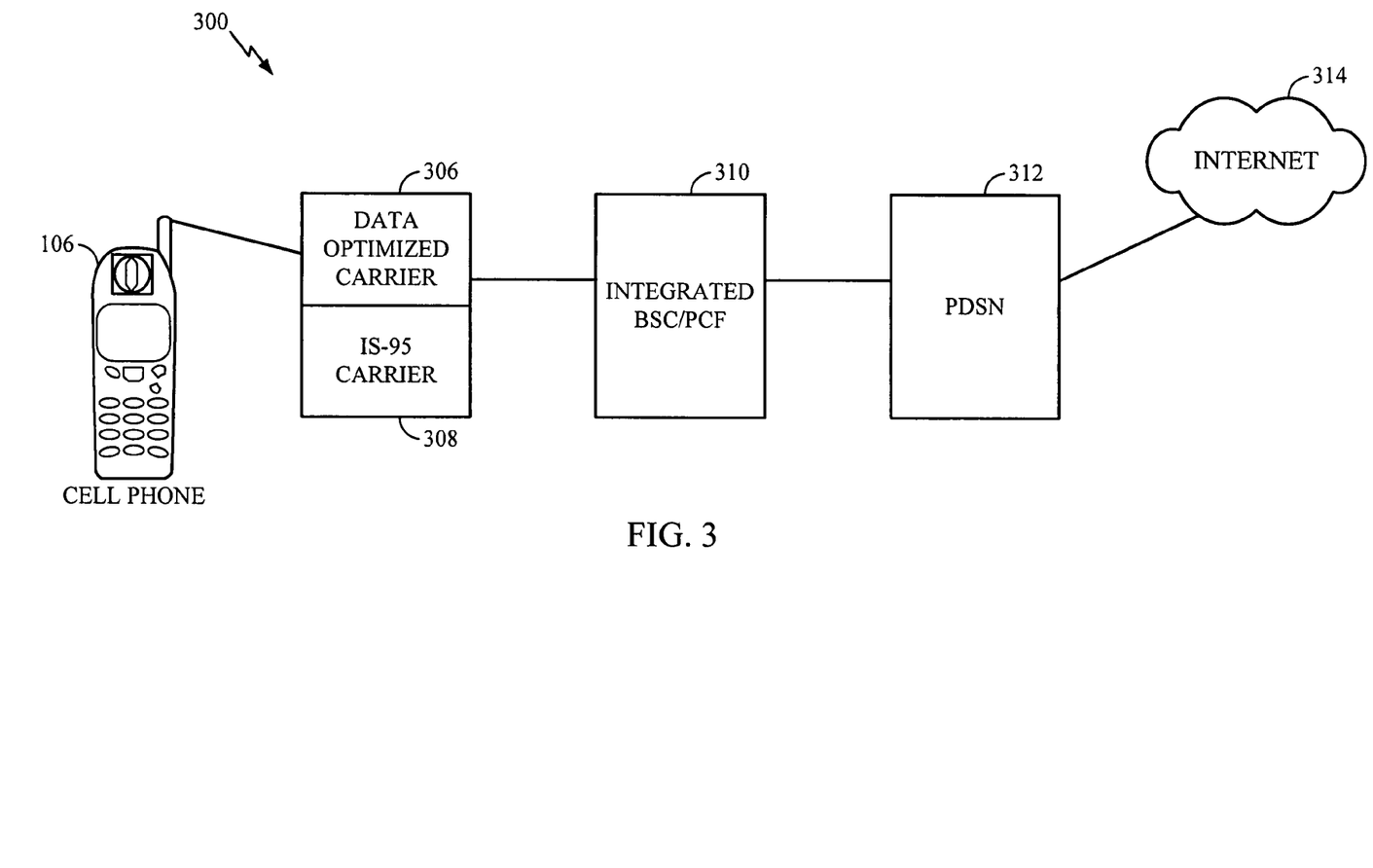
FIG. 3 is a diagram illustrating the overlay of a data optimized system with a typical wireless network in accordance with an embodiment of the invention.

FIG. 3 shows how a data optimized system 300 overlays the existing wireless network. The wireless device or remote station 106 receives two carriers 306 and 308. Carrier 306 is a data optimized carrier. Carrier 308 is a typical wireless communication carrier. Both carriers are sent from an integrated BSC/PCF 310. The BSC/PCF is connected to the PDSN 312, which in turn is connected to the internet 314.

The wireless device 102 communicates over the air with the BTS at the cell site. Each BTS typically integrates multiple frequency carriers (e.g., 1.25 MHz), which can be used for either conventional wireless service or data optimized service. Cell sites, towers, and antennas are shared between the conventional wireless and data optimized systems, and the cell coverage area is the same for both systems.

When the user is transmitting data, the data packets are sent from the wireless device over the air to the BTS, and are then forwarded to the Base Station Controller/Packet Control Function (BCS/PCF) 310. The BSC forwards the data to the PCF 310, which is integrated with the BSC. The PCF then forwards the data to the PDSN 312. When the user is receiving data, packets destined for the user arrive at the provider's IP network and the PDSN 312 forwards the packets to the BSC/PCF 310 which subsequently forwards them to the BTS and on to the user.

Each BTS includes both RF and digital components for multiple RF carriers (e.g., 1.25 MHz) at the cell site. The BTS terminates the airlink and provides the radio link protocol (RLP)/user datagram protocol (UDP) connectivity to the BSC over the backhaul. The backhaul is packetized. An RF carrier (e.g., 1.25 MHz) may be deployed in an omni antenna or a sectorized antenna. Each data optimized sector is capable of reaching peak rates of up to 2.4 Mbs on the forward link and up to 153.6 Kbps on the reverse link.

Multiple base station transceivers (BTS) are connected to a given BSC. As the remote station moves between cell sites, the remote station is handed off from one BTS to another. The BSC performs session control, connection control and selection functions to support each remote station's session.

The PCF provides the functionality to handle the packet data. The PCF manages the interfaces between the PDSN 312 and BSC. The PCF manages the setup for the Generic Routing Encapsulation Tunnel (GRE/IP) interface to the PDSN 312, PDSN selection, tracks all device idle timers, and supplies this information to the BSC.

PDSN 312 performs traditional Network Access Server (NAS) functionality, such as Point-to-Point Protocol (PPP). Both IS-95 and IS-856 data optimized services use the same PDSN 312.

The forward link structure of the data optimized system differs from that of a typical wireless communication system because of the high data rates necessary to support data and broadcast services. The forward link physical layer is organized around carriers that provide a data channel divided into slots of a given size, (e.g., 1.66 ms). These channels are time-division-multiplexed (TDM) for pilot channels, control channels and user traffic channels. Users are assigned a particular time for TDM traffic using a scheduler. Specific time slots are used to send pilot and control information, including paging and synchronization functions. Full power is dedicated to a single remote station during the assigned time period. While power is fixed, transmission rate is variable and determined from feedback sent over the reverse link by the remote station. The transmission rate used on the forward link for a user is the same rate requested by the remote station on the reverse link and is determined by the remote station in response to channel conditions. Thus, in a data optimized system each user is assigned a period of time during which only that user's data is transmitted at full power on the forward link.

The reverse link in a data optimized system differs from the forward link. The reverse link transmissions of the individual remote stations are code division multiplexed (CDM) as are reverse link transmissions in an IS-95 system. The reverse link also uses variable power and variable rate transmission, with rates from 9.6 kbps up to 153.6 kbps. Power control on the reverse link uses soft and softer handoff as found in IS-95 systems.

Figure 4:
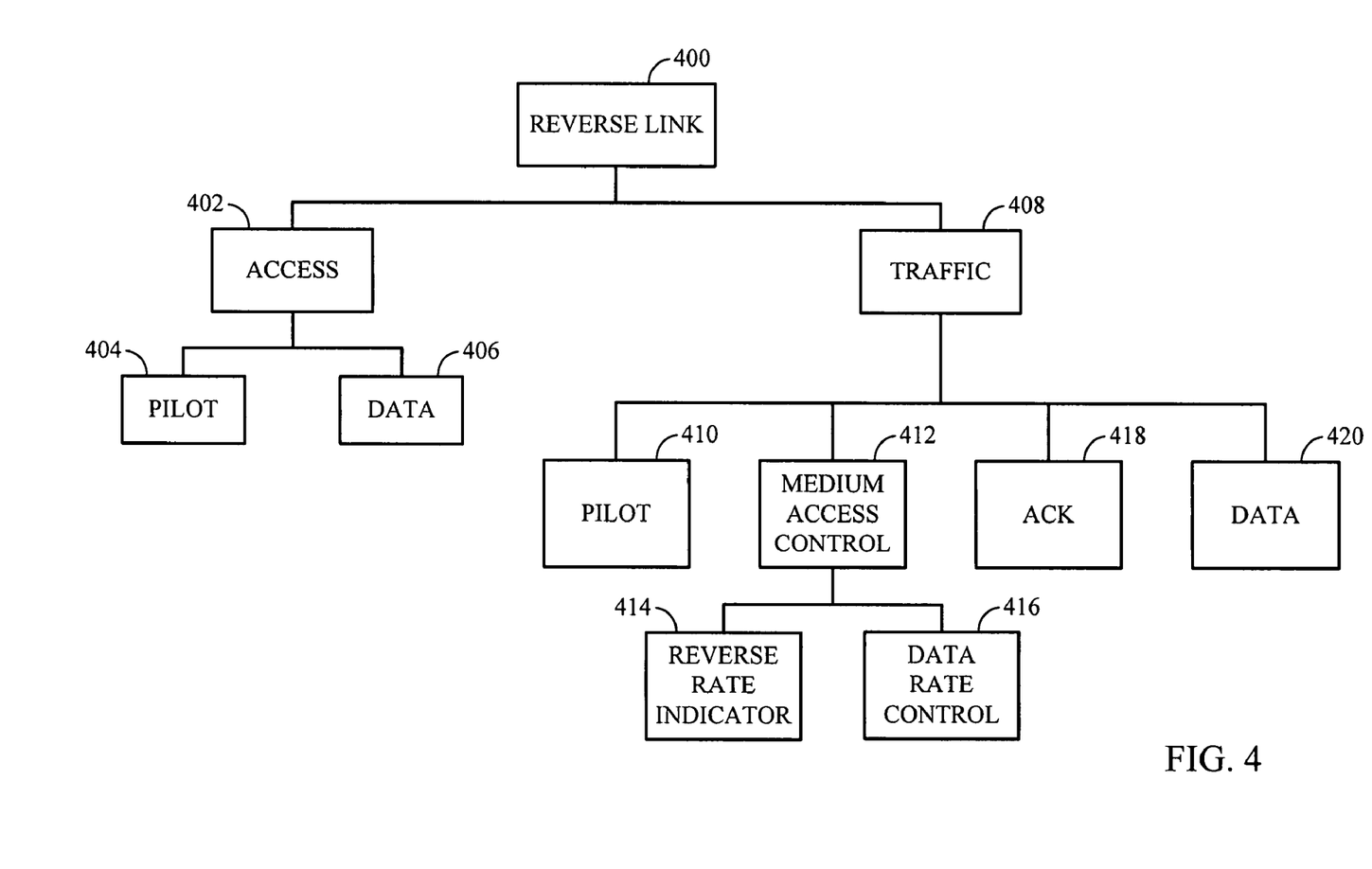
FIG. 4 is a diagram showing the structure of the reverse link channels in a data optimized system in accordance with an embodiment of the invention.

FIG. 4 shows the channel structure of the reverse link. The reverse link 400 has two main channels: Access channel 402 and Traffic channel 408. Access channel 402 is used by the remote station to being communications with the network or to respond to a message directed to the remote station. The Access channel 402 consists of two sub-channels: Pilot channel 404 and Data channel 406. Pilot channel 404 provides a reference for coherent demodulation and timing. Data channel 406 carries Access channel data for use by the remote station to acquire the data optimized system. Traffic channel 408 consists of the following channels: Pilot channel 410, Medium Access Control channel 412, Acknowledgement channel 418, and Data channel 420. Pilot channel 410 provides a reference for coherent demodulation and timing. Medium Access Control (MAC) channel 412 consists of two sub-channels: Reverse Rate Indicator (RRI) sub-channel 414 which indicates that date rate of Reverse Link transmissions, and Data Rate Control (DRC) channel 416. The DRC channel is used by the remote station to indicate to the network the supportable forward traffic channel data rate. Acknowledgement (ACK) channel 418 acknowledges correctly received forward link packets. Data channel 420 contains user data and control information.

Figure 5:
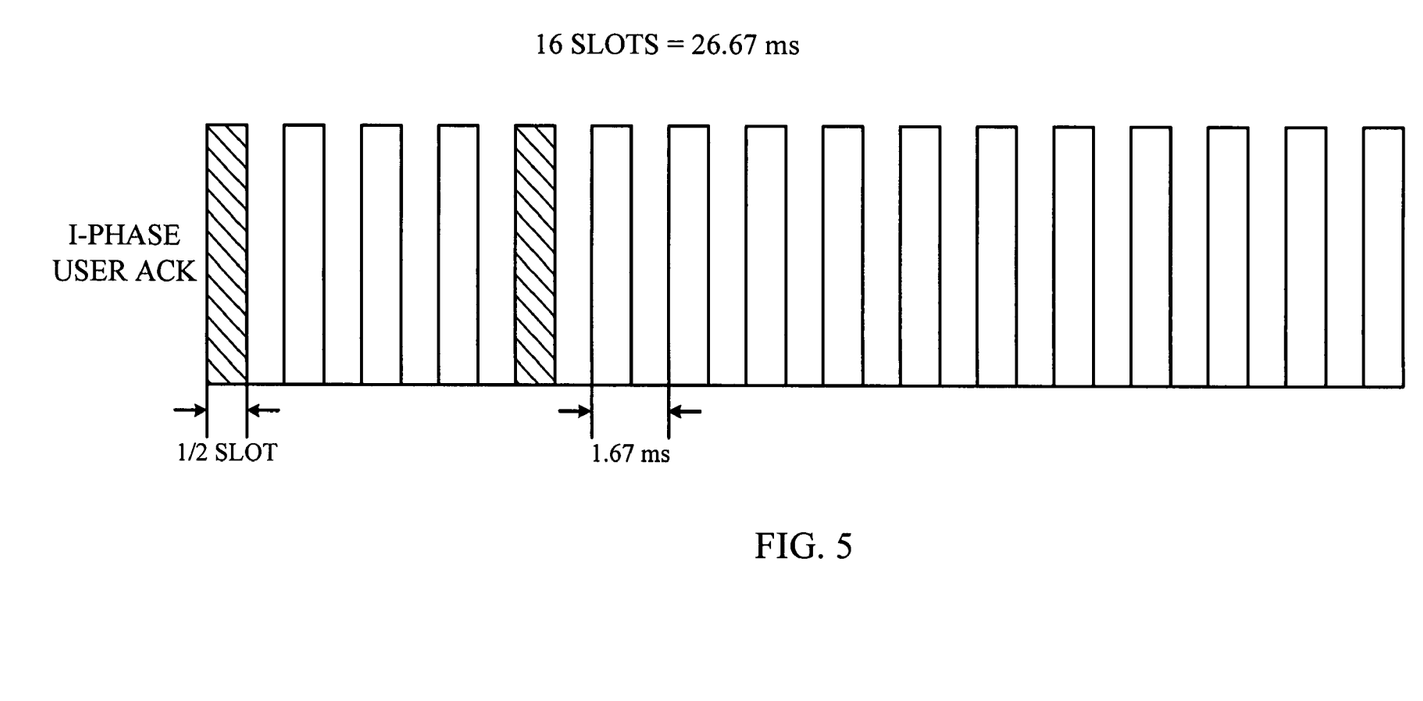
FIG. 5 illustrates the channel structure of the ACK channel in accordance with an embodiment of the invention.

FIG. 5 illustrates the structure of the ACK channel. The ACK channel is sent on the first half of each slot on the I-channel in response to every Forward Traffic Channel addressed to it; otherwise the ACK channel is gated off. A full slot on the ACK channel occupies 1.67 ms.

The ACK channel indicates whether a data packet sent on the forward traffic channel is received correctly. The ACK channel transmits a '0' bit if the data packet has been successfully received, and a '1' if a data packet has not been successfully received.

Figure 6:
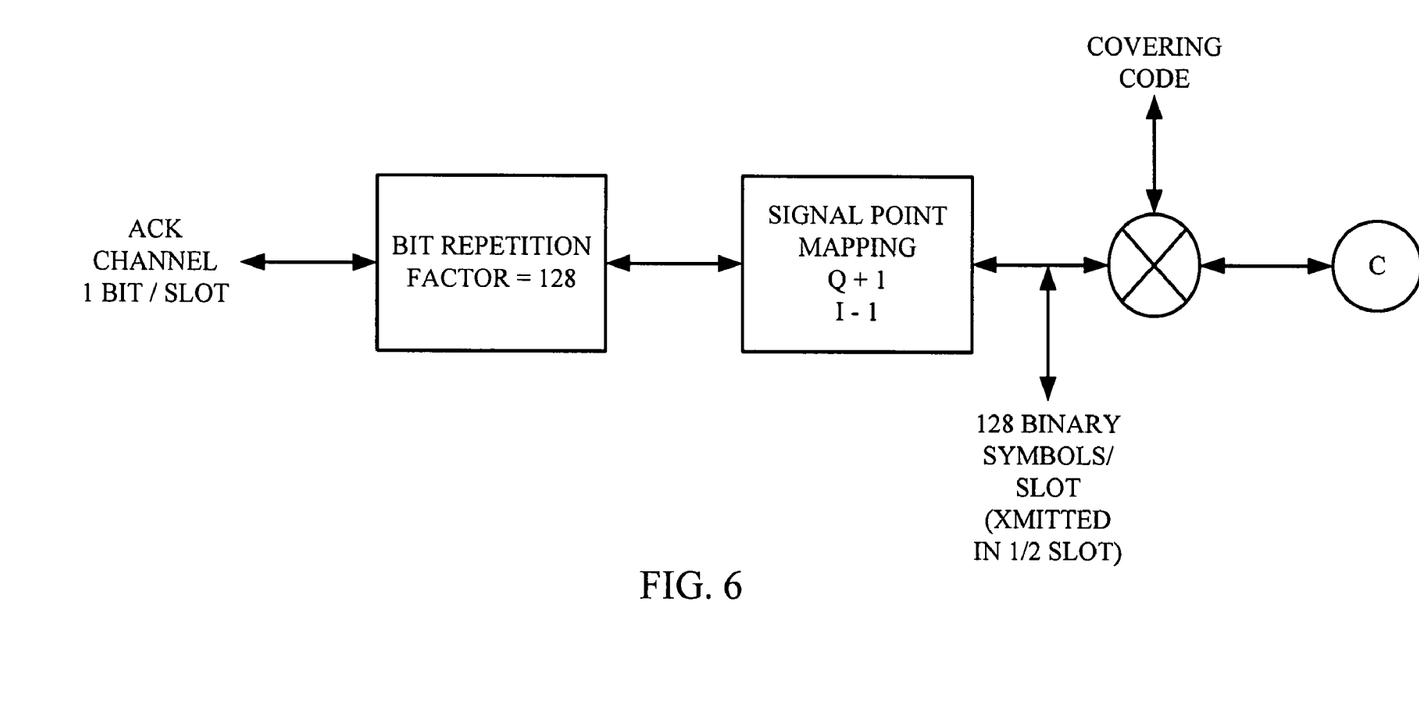
FIG. 6 illustrates construction of the ACK channel in accordance with an embodiment of the invention.

FIG. 6 illustrates the physical structure of the ACK channel. The ACK channel is generated by taking a single ACK bit, repeating this bit 128 times and covering the resulting 128 symbols with a code unique to the ACK channel. The gain of the ACK channel is then set relative to that of the forward traffic channel pilot and is bi-phase-shift-keyed (BPSK) modulated by quadrature spread on the I channel.

The ACK channel is transmitted at a specific rate, (e.g., 9.6 kbps) in response to every forward traffic channel preamble that is detected by the remote station; otherwise the ACK channel is gated off. The ACK channel is transmitted in the first half of a slot as shown in FIG. 6, and has a duration of 1024 chips. The ACK channel acknowledges a packet three slots after the packet is received.

The ACK channel uses frames for transmission. Various codes may be used within the frame structure. Longer codewords have a reduced peak power requirement and perform better than shorter codewords. The codes are described relative to the frame structure in terms of four variables:

Let M be the number of ACK channel code symbols per frame slot.

Let N be the number of independent slots per frame.

Let R be the code repetition factor.

Let S be the length of the ACK channel frame, expressed as a number of ACK channel symbols.

The relationship between the four variables can be expressed using the following equation:

$$S = M*N*R \qquad (1)$$

Each of the above variables may be selected to improve ACK channel performance. Values should be selected that provide minimum code interference while maintaining peak performance. Exemplary codes are discussed below.

One exemplary code for use in an ACK channel is defined as follows:

M=8, N=6, R=2, S=96

This code can support up to 48 users and results in a 5 ms frame. The number of ACK code symbols per slot is represented by a matrix. For this code the code is produced by the repetition of $W^8$, where the repetitions are 48 symbols apart.

$$W^8 = \begin{matrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{matrix} \qquad (2)$$

An alternate embodiment of the ACK channel code is defined as follows:

M=16, N=3, R=2, S=96

This code also can support up to 48 users and also results in a 5 ms frame. The code is produced by the repetition of $M^{16}$, the length 16 m-sequence construction code, where the repetitions are 48 symbols apart.

$$M^{16} = \begin{matrix} 1 & 1 & 1 & 1 & 1 & 1 & 1 & 1 & 1 & 1 & 1 & 1 & 1 & 1 & 1 & 1 \\ 1 & 1 & -1 & 1 & -1 & -1 & 1 & 1 & -1 & 1 & 1 & 1 & -1 & -1 & -1 & -1 \\ 1 & -1 & 1 & -1 & -1 & 1 & 1 & -1 & 1 & 1 & 1 & -1 & -1 & -1 & -1 & 1 \\ 1 & 1 & -1 & -1 & 1 & 1 & -1 & 1 & 1 & 1 & -1 & -1 & -1 & -1 & 1 & -1 \\ 1 & -1 & -1 & 1 & 1 & -1 & 1 & 1 & 1 & -1 & -1 & -1 & -1 & 1 & -1 & 1 \\ 1 & -1 & 1 & 1 & -1 & 1 & 1 & 1 & -1 & -1 & -1 & -1 & 1 & -1 & 1 & -1 \\ 1 & 1 & 1 & -1 & 1 & 1 & 1 & -1 & -1 & -1 & -1 & 1 & -1 & 1 & -1 & -1 \\ 1 & 1 & -1 & 1 & 1 & 1 & -1 & -1 & -1 & -1 & 1 & -1 & 1 & -1 & -1 & 1 \\ 1 & -1 & 1 & 1 & 1 & -1 & -1 & -1 & -1 & 1 & -1 & 1 & -1 & -1 & 1 & 1 \\ 1 & 1 & 1 & 1 & -1 & -1 & -1 & -1 & 1 & -1 & 1 & -1 & -1 & 1 & 1 & -1 \\ 1 & 1 & 1 & -1 & -1 & -1 & -1 & 1 & -1 & 1 & -1 & -1 & 1 & 1 & -1 & 1 \\ 1 & 1 & -1 & -1 & -1 & -1 & 1 & -1 & 1 & -1 & -1 & 1 & 1 & -1 & 1 & 1 \\ 1 & -1 & -1 & -1 & -1 & 1 & -1 & 1 & -1 & -1 & 1 & 1 & -1 & 1 & 1 & 1 \\ 1 & -1 & -1 & -1 & 1 & -1 & 1 & -1 & -1 & 1 & 1 & -1 & 1 & 1 & 1 & -1 \\ 1 & -1 & -1 & 1 & -1 & 1 & -1 & -1 & 1 & 1 & -1 & 1 & 1 & 1 & -1 & -1 \\ 1 & -1 & 1 & -1 & 1 & -1 & -1 & 1 & 1 & -1 & 1 & 1 & 1 & -1 & -1 & -1 \end{matrix} \qquad (3)$$

An advantageous embodiment of the ACK channel code is defined as follows:

M=64, N=1, R=2, S=96

This code can support up to 64 users and results in a 6.67 ms frame. This code is the repetition of $M^{64}$, the length 64 m-sequence construction code, where the repetitions are 64 symbols apart.

The second row of $M^{64}$ is given below.

$$\begin{matrix} 1 & 1 & -1 & 1 & 1 & -1 & 1 & -1 & 1 & -1 & 1 & 1 & -1 & -1 & 1 & -1 & 1 & 1 & 1 & 1 & -1 & 1 \\ 1 & 1 & -1 & 1 & -1 & -1 & 1 & -1 & -1 & -1 & -1 & -1 & -1 & 1 & -1 & 1 & -1 & -1 & -1 & 1 & 1 \\ 1 & -1 & -1 & 1 & 1 & -1 & -1 & -1 & 1 & -1 & -1 & 1 & 1 & 1 & 1 & -1 & -1 & -1 & -1 & 1 \end{matrix} \qquad (4)$$

Channel Structures

Possible channel structures can be categorized as pure TDM, pure CDM, and Hybrid TDM/CDM. Each potential channel structure has different advantages and limitations.

Channel Structure Assumptions

The challenge in creating an acknowledgement channel structure is represented by the stringent decoding error performance requirements. The target error rate are low, on the order of 0.1% for false alarm and 1% for missed detection. For all discussed channel structures here, a 5 ms frame length, W64 channelization code, and up to 48 supported users is assumed. Since with W64, there are 24 available code symbols per PCG, for the 4 PCG frame length, therefore theoretically, 96 users supported (or 192 users on both I and Q). Allowing a repetition factor of 2 to achieve time diversity in the TDM and Hybrid TDM/CDM case and reduce cross-talk for the pure CDM case, results in 48 users supported. The latter is achieved by repeating the codewords within the acknowledgment channel frame. Assume On/Off encoding for acknowledgment channel (ACK), i.e ACK is mapped to '+1', while (negative acknowledgment) NAK is mapped to '0'.

Pure TDM Approach

A simple estimate of the required peak acknowledgment channel power in AWGN may be calculated as follows. The distance between NAK and ACK, d, is calculated as the sum of the required minimum distance of the signal points from the threshold (each having been normalized with respect to the noise).

$$d=\sqrt{}\sqrt{2}\cdot(erf^{-1}(1-2\cdot P_{fa})+erf^{-1}(1-2\cdot P_{md})) \qquad (5)$$

where $P_{fa}$ and $P_{md}$ are the target false alarm and missed detection probabilities, respectively. The acknowledgment channel $E_b/N_t$ requirement can be calculated as $$E_b/N_t(ACK) = \frac{d^2}{2}, \qquad (6)$$

where the factor of 2 in the denominator is needed because of the coherent BPSK decoding, with the assumption of perfect phase estimate.

Substituting the target decoding error rate probabilities gives $E_b/N_t$=11.7 dB.

With the assumptions mentioned above, the processing gain can be simply calculated as 64*4=128=21.1 dB.

In 0 dB FL geometry, the required normalized peak F-ACKCH power is 11.7 dB−21.1 dB=−9.4 dB, i.e. 11% of the total BS power per user. In −5 dB FL geometry, the required peak power would be 33% of the total BS power per user. In fading channel cases, the required peak power is even higher. It doesn't seem to be likely that this peak power requirement can be supported by the base station; therefore, the pure TDM approach is not practical.

Hybrid TDM/CDM and Pure CDM Approaches

These two approaches will be considered together because the pure CDM approach is viewed a subcase of the Hybrid TDM/CDM approach. The exact number of time slots per frame should be decided by optimization of the trade-offs described below.

Let M be the number of ACKCH code symbols per TDM slot. Then the number of independent TDM slots per frame, N, is N=96/(2*M), where the factor of 2 is the result of the code repetition. (Remember that the codeword is repeated for the pure CDM case, as well.) The pure TDM approach would be the case with N=48 and M=1, while the pure CDM approach is the case with N=1 and M=48.

The selection of N (and M) is a trade-off between the following factors:

1. Increasing M improves time diversity, therefore it reduces the missed detection rate. Since all approaches are assumed to have a built-in repetition factor of 2, the additional time diversity gain that might be achieved by extending the slot size is less than what the difference is slot size would imply. For example, with M=8 and N=6 (hybrid TDM/CDM), the maximum time difference between code symbols of any given codeword is 8+96/2=52, while with M=48 and N=1 (pure CDM), the maximum time difference between code symbols of any given codeword is 96. So in this case, the maximum difference increases by a factor of 96/52=1.85, which is less than the factor of increase in slot length (M), which is 48/8=6. For simplicity, hereinafter, it is assumed that all approaches achieve the same time diversity, even though this is somewhat biased towards favoring the smaller slot length cases.
2. Increasing M decreases the peak power requirement per user. Based on the factors discussed above, all approaches should have approximately the same $E_b/N_t$ requirement. Reducing the slot size inversely proportionally increases the peak power requirement on a per user basis. Note that if the users (weighted by their individual acknowledgment power requirement) are evenly distributed among the slots, then the total peak power requirement would be the same for any M and N. The likelihood of this condition to exist, however, decreases rapidly as N is increased.
3. Increasing M increases the cross-channel interference.

Existing F-ACKCH Channelization Codes for CDM

Both analytical and simulation results show that the worst code pair is $(W_i^M, W_{i+M/2}^M)$. This is because the element-wise product of that pair has long sequence (actually of length M/2) consecutive '+'s followed by an equally long sequence (length M/2) consecutive '−'s. It is true in general for any $W^M$ that the element-wise product of the pair $(W_i^M, W_{i+2^k M}^M)$ consists of alternating groups of '+'s and '−'s, where the length of each group is $2^k$. The worst code pairs in this channelization code give a cross-product that is identical to that of the worst code pair in the Walsh code. Therefore, only the Walsh code is discussed in this Section.

Intuitively, the cross-correlation performance of any code word pair will be in close relation with the length of the longest run (i.e the maximum length of consecutive '+'s or '−'s) in the element-wise product of that pair.

Based on the above, the Walsh code seems to be a particularly bad selection, because each of its code words has a companion code word with which it forms the element-wise product exhibiting the worst possible run length.

Note that one way of finding the best code book could be performing a search. Starting with any possible binary orthogonal matrix, the columns can be permuted (assuming that the code words form the rows of the matrix) and then check the cross-talk properties of every possible codeword pair by either simulations or analytical methods. This search could be repeated for any nonequivalent orthogonal matrix construction. Unfortunately, the computational complexity of such a search seems to be prohibitive.

Possible New F-ACKCH Code for CDM

A well-known binary orthogonal matrix construction, for any M that is a power of 2, is the m-sequence construction. The construction can be most easily explained as a two-step process:

1. Form a (M−1)×(M−1) submatrix by assembling all possible cyclic shifts of a length M−1 m-sequence as the rows of that submatrix.
2. Extend the sub-matrix to dimension M×M by adding an all '+' row and an all '+' column.

Equivalently, define the construction by expressing matrix element $K_{ij}$ as $$K_{i,j} = \begin{cases} +1 & \text{if } (i-1)\cdot(j-1) = 0 \\ (-1)^{Tr(\alpha^{i+j})} & \text{otherwise} \end{cases}, \qquad (7)$$

where Tr(x) is the trace function, defined as $$Tr(x) = \sum_{i=0}^{\log_2 M - 1} x^{2^i}, \qquad (8)$$

and α is a primitive element in GF(M).

It is trivial to show that the element-wise product of any codeword pair is also an m-sequence with an additional '+' inserted. As such, the maximum run length is known to be log 2(M), which grows quite a bit slower as M increases compared with the rate at which the maximum run length of the Walsh code (equals M/2) increases. Based on the above, it is very likely that the m-sequence construction gives channelization codes that perform a lot better than Walsh codes.

Figure 7:
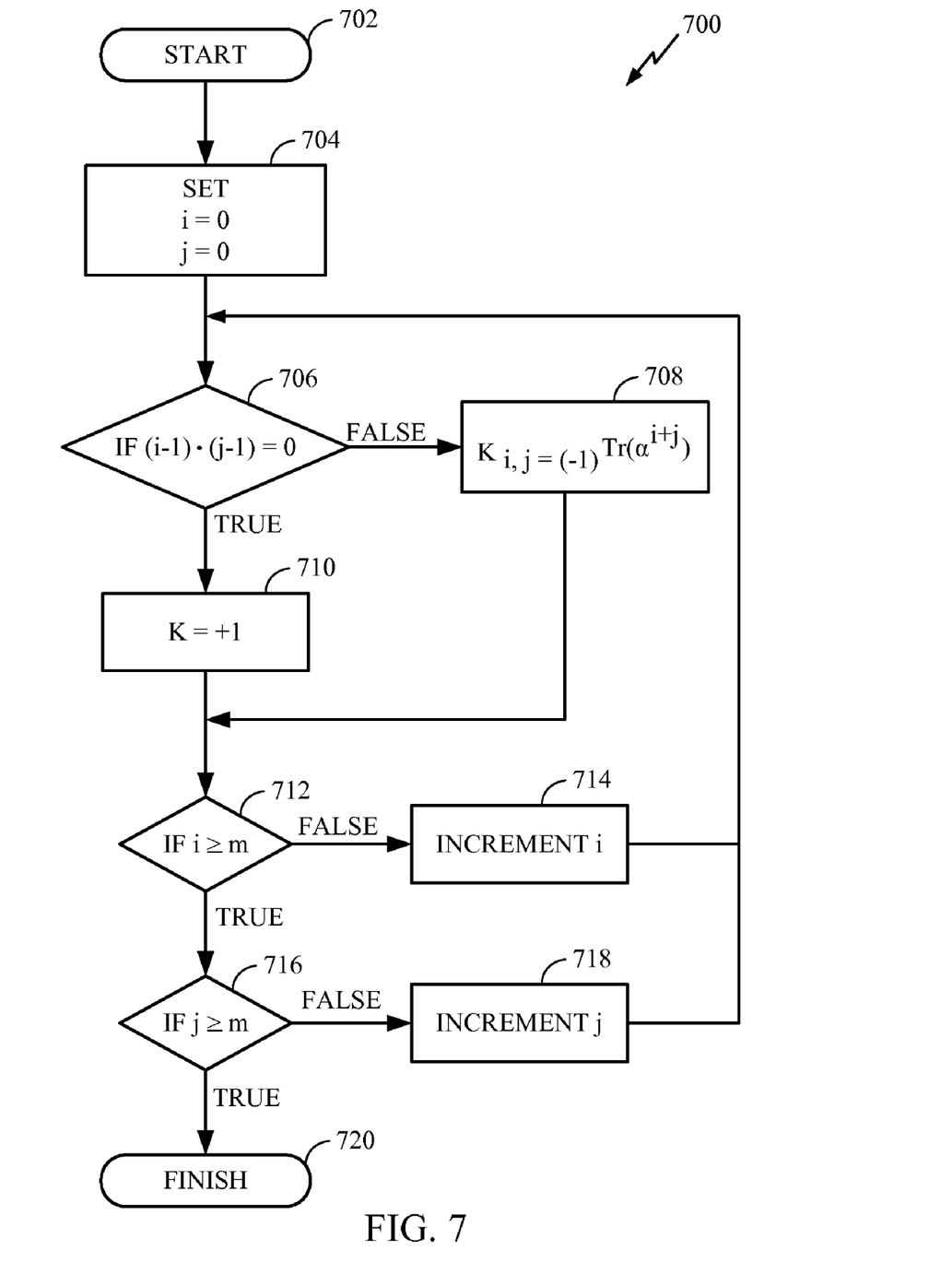
FIG. 7 is a flow diagram of the steps necessary to create an m-sequence matrix in accordance with an embodiment of the invention.

FIG. 7 illustrates the steps used to create an m-sequence matrix for use in an embodiment of the invention. A method of generating an m-sequence matrix, 700 begins with step 702, the start. Set i=0 and j=0, where i and j are rows and columns of the matrix. At step 706 check the following statement: if (i−1)*(j−1)=0. If the statement is true, then at step 710 Ki,j=+1. Continue with step 712 and test the following statement: if i≧m. If the statement is true then proceed in step 716 to test the following statement: if j≧m. If the statement is true then the process is complete. If, however, the statement in step 706 is false, then $K_{i,j}=(-1)^{Tr(\alpha^{ij})}$ as specified in step 708. After step 708 the process returns step 712. If step 712 results in a false then i is incremented and the process returns to step 706 to re-test if (i−1)·(j−1)=0. The process flow continues through step 712 until a true result is obtained. Flow then proceeds to step 716 as described above. If the result in step 716 is false then j is incremented in step 718 and the process flow again returns to step 706. After a true result is obtained in step 716 process flow terminates at step 720.

Codeword Permutations between Repetitions

With any channelization code, there expected to be some variation between the performance of its different code word pairs (more with the Walsh construction and less with the m-sequence construction). The performance of the worst codeword pair in any of the CDM schemes can be improved, which results in a reduction of the cross-correlation problem, if the users' codeword assignment is permuted in between the code word repetitions. This would ensure that if a high power ACK channel strongly interferes with a low power acknowledgment channel in a particular CDM slot, then in the repetition slot, the same condition will be less likely to occur. A time varying 'pseudorandom' permutation could also be used, but an appropriate systematic permutation is expected to perform better than the 'pseudorandom' permutation. Finding a suitable systematic permutation is non-trivial in the general case but it is relatively simple in either the cases of the m-sequence construction or the Walsh construction, as will be discussed below.

1. m-sequence construction: Even though the maximum run length of any code word pair in the m-sequence construction is the same, there is probably a slight performance difference depending on where those maximal run-lengths occur in the element-wise product. For example if the longest run of '+'s and '−'s appear at the beginning and at the end, respectively, than the performance is expected to be somewhat worse compared to the case when they appear next to each other. Pairing the worst and best cases can be achieved by simply cyclically shifting every codeword by M/2 between the code word repetitions.

2. Walsh construction: In the case of the Walsh code, the worst codeword pairs are the ones for which the resulting cross-product is a Walsh code with index k, where k is a 'high' power of 2. (Remember that all cross-products are also Walsh codes.) Intuitively, a good permutation is one that maps 'high' powers of 2 to 'low' powers of 2. Note that the $j^{th}$ element of the element-wise cross-product of codeword pair $(W_k^M, W_l^M)$ can be expressed as $$(W_k^M \cdot W_l^M)_j = \sum_{i=0}^{\log_2 M - 1} (-1)^{(k_i + l_i) j_i}, \quad (9)$$

where $k_i$, $l_i$ and $j_i$ are the $i^{th}$ bits in the binary expressions of k, l and j, respectively. Then, a good permutation is achieved by expressing the index of the first code word in binary form, and flipping the bits (in the MSB-LSB direction) in order to get the index of the repetition codeword. In other words, k is mapped to k', where $$k' = \sum_{i=0}^{\log_2 M - 1} k_i \cdot 2^{\log_2 M - 1 - i}, \quad (10)$$

where $k_i$ is the $i^{th}$ bit in the binary expression of k.

As an example, take the length 8 Walsh code, $W^8$. Without the permutation, the concatenated codewords (i.e. the repetition codeword appended to the first codeword) are the following:

$[W_1^M W_1^M]$
$[W_1^M W_2^M]$
$[W_3^M W_3^M]$
$[W_4^M W_4^M]$
$[W_5^M W_5^M]$
$[W_6^M W_6^M]$
$[W_7^M W_7^M]$
$[W_8^M W_7^M]$

With the permutation, the concatenated codewords are the following:

$[W_2^M W_5^M]$
$[W_3^M W_3^M]$
$[W_4^M W_7^M]$
$[W_5^M W_2^M]$
$[W_6^M W_6^M]$
$[W_7^M W_4^M]$
$[W_8^M W_8^M]$

As a comparison, the run length in the first codeword was computed plus the run length in the repetition codeword. For $W^8$ without permutation, the resulting values for all the non-zero concatenated codewords are:

2, 4, 4, 8, 4, 8, 4 while the results for $W^8$ with the permutation are:

5, 4, 6, 5, 4, 6, 4

Clearly, the permutation reduces the combined maximum run length (from 8 to 6), as expected.

Decoding Complexity

Another important aspect of the channelization code selection is the ease of carrying out the signal correlation when decoding the received signal. Two cases can be distinguished:

1. The receiver only decodes the intended code
2. The receiver decodes all acknowledgment channel codes for cross-correlation detection purposes In case 1, above, the only complexity is generating a local copy of the channelization code, which can be equally easily done for Walsh and the m-sequence construction cases.

In case 2, the Walsh codes have the advantage of enabling a fast Walsh transformation, where the number of required operations is proportional to M*log 2(M), as opposed to being proportional to M2, which holds in the general case. The code words obtained by the m-sequence construction are equally easily decodable. This is because the m-sequence matrix and the Walsh matrix are isomorphic, i.e., there is a permutation of rows and columns that transforms one into the other.

The column permutation is given by $$k' = \log_\alpha\left(\sum_{i=0}^{\log_2 M - 1} k_i \cdot \alpha^i\right), \quad (11)$$

where $k_i$ is the $i^{th}$ bit in the binary expression of the column index k, and $\log_\square(x)$ is the logarithm of x in the finite field GF(M).

The row permutation is given by $$l' = \log_\alpha\left(\sum_{i=0}^{\log_2 M - 1} y_i \cdot \alpha^i\right), \quad (12)$$

where the $y_i$ are the elements of vector y, where y is computed as $\underline{y} = \underline{K} \cdot \underline{l}$, where $\underline{K}$ is defined as $\underline{K} = \underline{H}^{-1}$, where $\underline{H}$ is the matrix whose elements are $h_{i,j} = \text{Tr}(\alpha^{i+j-2})$. Note that $\underline{l}$ is the vector whose elements are the binary digits of the row index l.

None of the computations described in this section need to be done during the decoding process; instead, the permutations can be executed based on stored permutation tables. Storing each of the two permutation tables (one for the row permutation and one for the column permutation) requires a memory size of only M*log 2M bits, which is very moderate. For example, with a code length of 64 symbols, M=64, the required memory would be 64*6/8=48 bytes.

In summary, decoding the newly proposed acknowledgment channel code represents essentially the same complexity as decoding the Walsh code.

The m-sequence ACKCH code structure has been described in this section. The following conclusions were reached:

1. The m-sequence ACKCH code has better cross-talk properties in fading channels than the Walsh ACKCH code.
2. The complexity of decoding is approximately the same for both the m-sequence code and Walsh code.

Therefore, one embodiment of an acknowledgment channel code uses a Hybrid TDM/CDM scheme with repetition factor of 2, where the ACKCH codewords are rows of a matrix obtained by using the m-sequence construction. Also, a deterministic permutation of the assigned codewords between the repetitions is included in an embodiment.

Basic Performance Comparison of the TDM and CDM/TDM Schemes

The following basic comparison can be made: assume AWGN channel, and perfect channel estimation. Then, for a false alarm rate (Pfa) of approximately 0.1% the decision threshold (Th) should be set at Th=±21/2*erf−1(1−Pfa) *σ=3.29*σ, while for an approximate 1% missed detection rate (Pmd) the signal amplitude is (As) be As=(Th+21/2*erf−1(1−2*Pfa))*σ=(Th+2.33)*σ=5.62*σ. This results in an Eb/No for the acknowledgment channel of 5.62²/2=15.79 (=12 dB), where the factor of 2 is due to coherent demodulation.

Assume a worst case geometry of −5dB, and a spreading gain of 64*96(=38 dB). The latter would be the result of using W64 for basic spreading, and ACK symbol duration of 5 ms (i.e. pure CDM approach).

With all the above, the acknowledgment channel power for a single −5 dB geometry user is 12 dB+5 dB−38 dB=−21 dB (=0.8%) relative to the total BS power. In a fading channel, the required power is significantly higher than this, for example, for channel model D, the required power is 4%, and for channel A, the required power is 15% for a single user.

Obviously, when the duration of the ACK symbol is reduced, then the required power will be increase in an inversely proportional relation. For example, if instead of length 48 acknowledgment channel codes, length 8 codes were used, then the required power would increase six-fold. It is possible under some channel conditions that a single −5dB geometry user would take up more than the total base station power. Clearly, as long as the cross-talk between the parallel ACK channels can be kept at a manageable level, the pure CDM approach is the preferable choice.

Methods to Reduce the Cross-Talk Between ACK Channels
Reducing the Code Length

In one embodiment, the basic spreading Walsh function is W64, instead of W128. The ACK symbol spans 2.5 ms, i.e. half of the proposed 5 ms acknowledgment channel slot. In the other half, the ACK symbol would be repeated.

With this set up, a W64 code channel can support 96 RL users, 48 on the I arm and 48 on the Q arm.

Selection of the F-ACKCH Code Book

A permuted H12 interleaved with the basis vectors of the fast Fourier transform of length 4 is used. To minimize memory requirements in the MS, the receiver could generate the matrix elements on the fly by following the simple algorithm described below:

To generate the $k^{th}$ symbol of the $j^{th}$ code word denoted as $H_{48}(j, k)$. Express j and k in binary form, i.e.

$$j = 32 \cdot j_5 + 16 \cdot j_4 + 8 \cdot j_3 + 4 \cdot j_2 + 2 \cdot j_1 + j_0 \quad (13)$$

and $$k = 32 \cdot k_5 + 16 \cdot k_4 + 8 \cdot k_3 + 4 \cdot k_2 + 2 \cdot k_1 + k_0. \quad (14)$$

Then, the code symbols can be given as $$H_{48}(j,k) = H_{12}([j_5:j_2],([k+/12])\bmod 12) \cdot i^{[j_1:j_0]\cdot[k_1:k_0]}, \quad (15)$$

where $[j_5:j_2]$, for example, means the integer whose binary representation is given by $j_5 j_4 j_3 j_2$; further, $i = \sqrt{-1}$, and $H_{12}$ is the following matrix $$\begin{pmatrix}
1, & 1, & 1, & 1, & 1, & 1, & 1, & 1, & 1, & 1, & 1, & 1 \\
1, & -1, & 1, & -1, & 1, & 1, & 1, & -1, & -1, & -1, & -1, & 1 \\
1, & -1, & -1, & 1, & -1, & -1, & 1, & -1, & -1, & 1, & 1, & 1 \\
1, & 1, & -1, & -1, & 1, & -1, & -1, & -1, & 1, & -1, & 1, & 1 \\
1, & -1, & 1, & -1, & -1, & -1, & 1, & 1, & 1, & -1, & 1, & -1 \\
1, & -1, & -1, & 1, & -1, & 1, & -1, & 1, & 1, & -1, & -1, & 1 \\
1, & -1, & -1, & -1, & 1, & 1, & -1, & 1, & -1, & 1, & 1, & -1 \\
1, & 1, & -1, & -1, & -1, & 1, & 1, & 1, & -1, & 1, & -1, & -1 \\
1, & 1, & 1, & -1, & -1, & -1, & -1, & 1, & -1, & 1, & -1, & 1 \\
1, & 1, & 1, & 1, & -1, & 1, & -1, & -1, & -1, & -1, & 1, & -1 \\
1, & -1, & 1, & 1, & 1, & -1, & -1, & 1, & 1, & -1, & -1, & -1 \\
1, & 1, & -1, & 1, & 1, & -1, & 1, & -1, & 1, & 1, & -1, & -1
\end{pmatrix} \quad (16)$$

The code construction could be equivalently described as follows:

Take the Kronecker product of $H_{12}$ and the matrix formed by the (un-normalized) basis vectors of the length 4 Fourier Transform.

Interleave by writing into the rows of a 4×13 matrix and reading out of the columns.

Note that if $H_{48}(j)$ is a row vector representing the jth code word on the I arm, then $i \cdot H_{48}(j)$ is a row vector representing the jth code word on the Q arm. Even though the code symbols come from the QPSK alphabet, the number of F-ACKCH sub-channels is still 96 per W64 code channel. The I-Q cross-talk is not expected to be a significant factor because of the independent PN spreading of the two arms.

Power Control

The forward acknowledgment channel gain for each user is set based on the reverse channel quality indicator channel feedback. For the simulations, perfect C/I feedback was assumed. This may be justified for at least channel the worst case channel with heavy cross talk because the C/I averaging in the mobile station reduces the effect of the feedback delay and C/I quantization errors.

In the simulations, the sub-channel gain is set in order to set the target Eb/No in the receiver. For worst case channel conditions, the gain margin was set to 7 dB. The maximum power used by any of the acknowledgment channel sub-channels was limited to 5% of the total base station power.

Because the worst case cross-talk is experienced by a good geometry user when interfered with by a low geometry user, the effect of the cross-talk can be mitigated by limiting maximal difference between acknowledgment channel sub-channel gains. In the simulations, it was assumed that no user will have a sub-channel gain that is more than 10 dB below the maximum sub-channel gain in the same slot.

Another way of reducing cross-talk is fixing the channel gains for the duration of the whole ACKCH symbol. If the acknowledgment channel symbol lasts 2.5 ms, i.e. 2 PCGs, then this would mean forgoing every other C/I feedback value. Of course, in some cases, such as in the case of channel model D, this would actually reduce performance because of the increased missed detection rate.

Setting the Decision Threshold

As mentioned before, the decision threshold in an ideal receiver would be set to $3.29 \ast \sigma$, where $\sigma$ is the estimated in-phase noise variance. In the simulations, the noise estimation error was modeled as an uncorrelated log-normal variable, with a 3 dB variance. In order for a receiver to compensate for this, the decision threshold is increased by a factor of $\sqrt{2}$.

Modified Setting of the Decision Threshold

There are ways for detecting the presence of cross-talk in the receiver. Assume that we want to decide whether the correlator output for user j1 is affected by the acknowledgment channel signal being sent to user j2. The cross-talk, $C_{j_1,j_2}$ in this case can be expressed as:

$$C_{j_1,j_2} = \sum_{m=1}^{2} \sum_{k=1}^{48} H_{48}(j_1, k) \cdot H_{48}(j_2, k) \cdot W_{64}^A(k) \cdot p(j_2) \cdot s(k), \quad (17)$$

where $W_{64}^A$ is the complex PN spread Walsh code use for the F-ACKCH, $p(j_2)$ is the F-ACKCH transmit power for user $j_2$ and s(k) is the composite channel gain in code symbol k.

The cross-talk can be estimated as $$\hat{C}_{j_1,j_2} = \sum_{m=1}^{2} \sum_{k=1}^{48} H_{48}(j_2, k) \cdot W_{64}^A(k) \cdot \quad (18)$$

-continued $$r(k) \cdot \frac{\sum_{m=1}^{2} \sum_{k=1}^{48} H_{48}(j_1, k) \cdot H_{48}(j_2, k) \cdot W_{64}^0(k) \cdot r(k)}{\sum_{m=1}^{2} \sum_{k=1}^{48} W_{64}^0(k) \cdot r(k)}$$

In the implemented decoding algorithm, if the calculated estimate $|\hat{C}_{i_1,j_2}|$ is greater than the decision threshold, then the decision threshold is increased by adding to it $|\hat{C}_{i_1,j_2}|$.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method comprising:
generating a set of codewords corresponding to a first channel for acknowledging correctly decoded transmissions according to an acknowledgment frame, the codewords based on a first matrix and each acknowledgment frame including one of the codewords and a repetition of the one of the codewords, the repetition of the one of the codewords being a different permutation of symbols of the one of the codewords.

2. The method of claim 1, wherein:
the first matrix is an m-sequence matrix, formed by assembling all possible cyclic shifts of a specific length as the rows of a submatrix, and extending the sub-matrix to a predetermined dimension by adding an all '+' row and an all '+' column.

3. The method of claim 1, wherein:
the first matrix is a Hadamard matrix.

4. The method of claim 1, wherein:
the first matrix is a permuted $H_{12}$ matrix interleaved with the basis vectors of a fast Fourier transform of a specific length.

5. The method of claim 2, wherein:
the first matrix is an $H_{16}$ resulting from m-sequence construction, interleaved with the basis vectors of a fast Fourier transform of a specific length.

6. A method for reducing cross-talk between channels used in acknowledging transmissions, the method comprising:
generating a set of codewords corresponding to a first channel for acknowledging correctly decoded transmissions according to an acknowledgment frame, the codewords based on a first matrix and each acknowledgment frame including one of the codewords and a repetition of the one of the codewords, the repetition of the one of the codewords being a different permutation of symbols of the one of the codewords;
forming the first matrix, and
spreading using a spreading function using a second matrix that is smaller than the first matrix.

7. The method of claim 6, wherein forming the first matrix comprises:
forming the first matrix using m-sequence construction by assembling all possible cyclic shifts of a specific length as the rows of a submatrix, and extending the sub-matrix to a predetermined dimension by adding an all '+' row and an all '+' column.

8. The method of claim 6, wherein:
the first matrix is a Hadamard matrix.

9. The method of claim 6, wherein:
the first matrix is a permuted $H_{12}$ matrix interleaved with the basis vectors of a fast Fourier transform of a specific length.

10. The method of claim 7, wherein:
the first matrix is a permuted $H_{16}$ matrix interleaved with the basis vectors of a fast Fourier transform of a specific length.

11. A method for reducing code length in an acknowledgment channel, the method comprising:
generating a set of codewords corresponding to a first channel for acknowledging correctly decoded transmissions according to an acknowledgment frame, the codewords based on a first matrix and each acknowledgment frame including one of the codewords and a repetition of the one of the codewords, the repetition of the one of the codewords being a different permutation of symbols of the one of the codewords;
forming the first matrix, and
spreading using a spreading function using a second matrix that is smaller than the first matrix.

12. The method of claim 11, wherein forming the first matrix comprises:
forming the first matrix using m-sequence construction by assembling all possible cyclic shifts of a specific length as the rows of a submatrix, and extending the sub-matrix to a predetermined dimension by adding an all '+' row and an all '+' column.

13. The method of claim 11, wherein:
the first matrix is a Hadamard matrix.

14. The method of claim 11, wherein:
the first matrix is a permuted $H_{12}$ matrix interleaved with the basis vectors of a fast Fourier transform of a specific length.

15. The method of claim 12, wherein:
the first matrix is a permuted $H_{16}$ matrix interleaved with the basis vectors of a fast Fourier transform of a specific length.

16. An apparatus for generating an acknowledgment channel, the apparatus comprising:
means for generating a set of codewords corresponding to a first channel for acknowledging correctly decoded transmissions according to an acknowledgment frame, the codewords based on a first matrix and each acknowledgment frame including one of the codewords and a repetition of the one of the codewords, the repetition of the one of the codewords being a different permutation of symbols of the one of the codewords;
means for forming the first matrix, and
means for spreading using a spreading function using a second matrix that is smaller than the first matrix.

17. An apparatus for generating an acknowledgment channel, the apparatus comprising:
a processor configured to generate a set of codewords corresponding to a first channel for acknowledging correctly decoded transmissions according to an acknowledgment frame, the codewords based on a first matrix and each acknowledgment frame including one of the codewords and a repetition of the one of the codewords, the repetition of the one of the codewords being a different permutation of symbols of the one of the codewords.

18. A storage medium including processor-executable instructions thereon for performing a method comprising:
generating a set of codewords corresponding to a first channel for acknowledging correctly decoded transmissions according to an acknowledgment frame, the codewords based on a first matrix and each acknowledgment frame including one of the codewords and a repetition of the one of the codewords, the repetition of the one of the codewords being a different permutation of symbols of the one of the codewords.

19. The apparatus according to claim 16, further comprising:
means for forming the first matrix, and
means for spreading using a spreading function using a second matrix that is smaller than the first matrix.

20. The apparatus according to claim 16, wherein:
the first matrix is an m-sequence matrix, formed by assembling all possible cyclic shifts of a specific length as the rows of a submatrix, and extending the sub-matrix to a predetermined dimension by adding an all '+' row and an all '+' column.

21. The apparatus according to claim 16, wherein: the first matrix is a Hadamard matrix.

22. The apparatus according to claim 16, wherein: the first matrix is a permuted $H_{12}$ matrix interleaved with the basis vectors of a fast Fourier transform of a specific length.

23. The apparatus according to claim 17, wherein said processor is further configured to:
form the first matrix, and
spread using a spreading function using a second matrix that is smaller than the first matrix.

24. The apparatus according to claim 17, wherein: the first matrix is an m-sequence matrix, formed by assembling all possible cyclic shifts of a specific length as the rows of a submatrix, and extending the sub-matrix to a predetermined dimension by adding an all '+' row and an all '+' column.

25. The apparatus according to claim 17, wherein: the first matrix is a Hadamard matrix.

26. The apparatus according to claim 17, wherein: the first matrix is a permuted $H_{12}$ matrix interleaved with the basis vectors of a fast Fourier transform of a specific length.

27. The apparatus according to claim 20, wherein: the first matrix is an $H_{16}$ resulting from m-sequence construction, interleaved with the basis vectors of a fast Fourier transform of a specific length.

28. The apparatus according to claim 24, wherein: the first matrix is an $H_{16}$ resulting from m-sequence construction, interleaved with the basis vectors of a fast Fourier transform of a specific length.

* * * * *